United States Patent
Nakamura et al.

(10) Patent No.: US 7,272,787 B2
(45) Date of Patent: Sep. 18, 2007

(54) WEB-COMPATIBLE ELECTRONIC DEVICE, WEB PAGE PROCESSING METHOD, AND PROGRAM

(75) Inventors: Masayuki Nakamura, Kanagawa (JP); Tetsuo Yutani, Kanagawa (JP); Kazutoshi Nagatome, Tokyo (JP); Shintaro Yamanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 140 days.

(21) Appl. No.: 10/523,234

(22) Filed: Jan. 26, 2005

(65) Prior Publication Data

US 2005/0289121 A1 Dec. 29, 2005

(30) Foreign Application Priority Data

May 27, 2003 (JP) ............................. 2003-149958

(51) Int. Cl.
*G06F 15/00* (2006.01)
*G06F 3/00* (2006.01)
(52) U.S. Cl. ...................... 715/513; 715/521; 715/526; 715/864; 715/517
(58) Field of Classification Search ................ 715/513, 715/514, 517, 526, 738, 525, 864, 907
See application file for complete search history.

(56) References Cited

U.S. PATENT DOCUMENTS

| | | | | |
|---|---|---|---|---|
| 5,701,500 A | * | 12/1997 | Ikeo et al. ................... | 715/517 |
| 6,125,204 A | * | 9/2000 | Nakatsuka et al. ......... | 382/173 |
| 6,282,548 B1 | * | 8/2001 | Burner et al. ............ | 707/104.1 |
| 6,751,777 B2 | * | 6/2004 | Bates et al. ............... | 715/501.1 |
| 6,865,720 B1 | * | 3/2005 | Ottani et al. ................ | 715/503 |
| 6,912,555 B2 | * | 6/2005 | Lemon et al. .............. | 715/513 |

(Continued)

FOREIGN PATENT DOCUMENTS

JP 2000-148788 5/2000

(Continued)

OTHER PUBLICATIONS

Orkut Buyukkokten, Efficient Web Browsing on Handheld Devices Using Page and Form Summarization, Jan. 2002, ACM Transactions on Information Systems, vol. 20 No. 1, pp. 82-115.*

(Continued)

*Primary Examiner*—Tadesse Hailu
*Assistant Examiner*—Nicholas S Ulrich
(74) *Attorney, Agent, or Firm*—Finnegan, Henderson, Farabow, Garrett & Dunner, L.L.P.

(57) ABSTRACT

A Web page having display elements such as a headline, a story body, subheads, and links to articles is obtained and rendered internally to obtain a position of each display element based on draw data. Each display element is classified into several clusters according to its position. Next, clusters having the same character attributes are classified as a group. A group having a high average of the number of characters within each of its clusters is determined as the story body and a group having a low average is determined as the headline. Then, individual pages including the story body and a top page including the headline, the subheads, and links to the story body pages are created. Therefore, the Web page is reconstructed as Web pages suitable for browsing in low-resolution display environments.

9 Claims, 16 Drawing Sheets

U.S. PATENT DOCUMENTS

| | | | |
|---|---|---|---|
| 6,925,613 B2* | 8/2005 | Gibson | 715/864 |
| 6,947,932 B2* | 9/2005 | Brandin et al. | 707/6 |
| 7,051,084 B1* | 5/2006 | Hayton et al. | 709/219 |
| 7,054,870 B2* | 5/2006 | Holbrook | 707/10 |
| 7,065,707 B2* | 6/2006 | Chen et al. | 715/513 |
| 7,093,001 B2* | 8/2006 | Yang et al. | 709/29 |
| 2001/0032218 A1* | 10/2001 | Huang | 707/513 |
| 2003/0004998 A1* | 1/2003 | Datta | 707/513 |
| 2003/0101203 A1* | 5/2003 | Chen et al. | 707/513 |
| 2003/0110236 A1* | 6/2003 | Yang et al. | 709/219 |
| 2003/0237053 A1* | 12/2003 | Chen et al. | 715/514 |
| 2004/0006740 A1* | 1/2004 | Krohn et al. | 715/513 |
| 2004/0010752 A1* | 1/2004 | Chan et al. | 715/513 |
| 2004/0049737 A1* | 3/2004 | Hunt et al. | 715/513 |
| 2004/0103371 A1* | 5/2004 | Chen et al. | 715/513 |
| 2004/0163041 A1* | 8/2004 | Engel | 715/509 |
| 2004/0205513 A1* | 10/2004 | Chen et al. | 715/501.1 |
| 2005/0022114 A1* | 1/2005 | Shanahan et al. | 715/513 |

FOREIGN PATENT DOCUMENTS

| | | |
|---|---|---|
| JP | 2001-209655 | 8/2001 |
| JP | 2002-156957 | 5/2002 |
| JP | 2002-259432 | 9/2002 |
| JP | 2003-122770 | 4/2003 |

OTHER PUBLICATIONS

Alex Strilets: http://www.cs.ualberta.ca/~zaiane/courses/cmput695-00/papers/wave.pdf; CMPUT 695 Knowledge Discovery in Databases, Dec. 1, 2000.

A copy of a communication issued on Mar. 20, 2007 from the Japanese Patent Office for Japanese Patent Application No. JP 2003-149958.

* cited by examiner

FIG.5
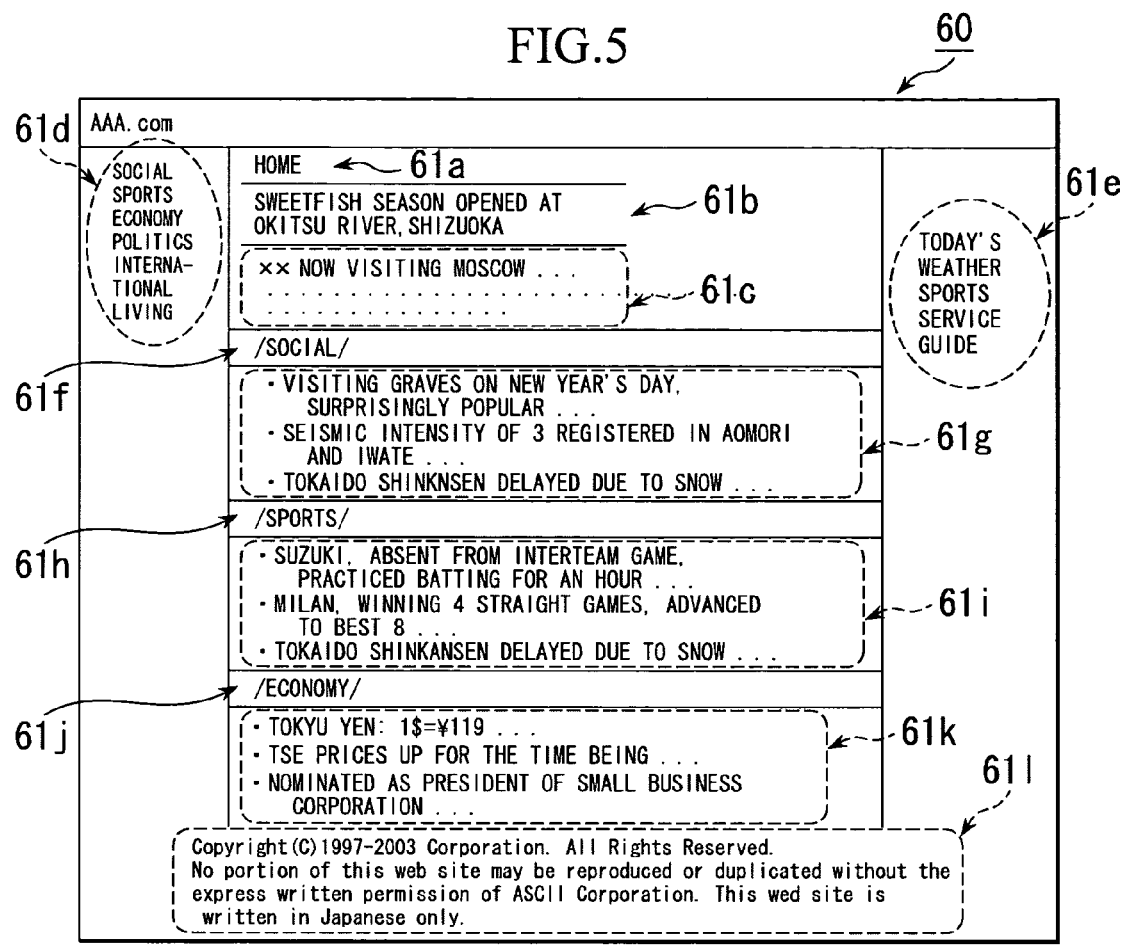
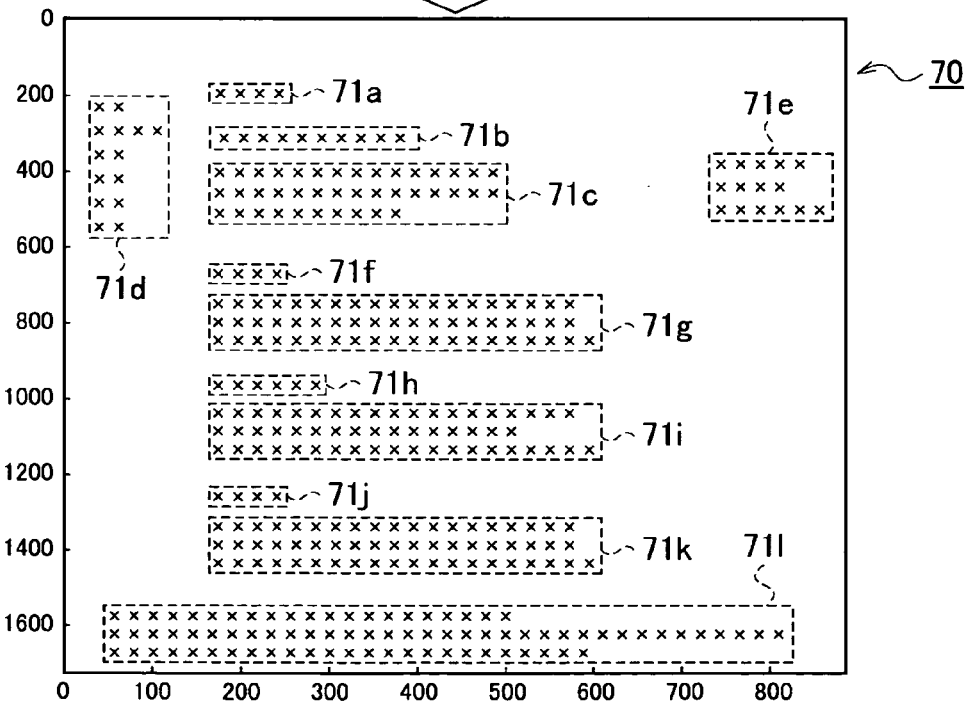

(L) : LEFTWARD
(R) : RIGHTWARD
(H) : HEADLINE OR SUBHEAD
(B) : LINKS TO BODIES OR ARTICLES
(U) : OTHERS

WEB-COMPATIBLE ELECTRONIC DEVICE, WEB PAGE PROCESSING METHOD, AND PROGRAM

TECHNICAL FIELD

The present invention relates to a Web-enabled electronics apparatus, a Web page processing method, and a program, which are applied to electronics apparatuses such as PDAs, portable telephones, television sets that have a function of connecting to a network, and which process content on the Web for display optimized for their own display environment.

BACKGROUND ART

It should generally be said that a man-machine interface for program-embedded, Web-enabled electronics apparatuses, such as PDAs (Personal Digital (Data) Assistants), portable telephones, television sets, is poor compared with that for personal computers. On the other hand, much of content on the Web is designed for browsing/display by personal computers that employ a mouse and a high-resolution display device. Thus, when a user tries to browse/display content on the Web using a Web-enabled electronics apparatus such as those mentioned above, the user could not help but encounter various inconveniences.

For example, most Web-enabled electronics apparatuses adopt a lower-resolution display device than that of personal computers. As mentioned earlier, many of Web pages are designed for browsing/display with high-resolution display devices used for personal computers. Thus, as shown in, e.g., FIG. 16, a low-resolution display device 162 with which a Web-enabled electronics apparatus 161 such as a PDA is equipped could display, in many situations, only a part 164 of a whole Web page 163 at a time, imposing a heavy burden on the user in his or her operation, such as having to repeat scrolling vertically and horizontally to view the whole page.

Methods of increasing the volume of information displayable on a small screen include methods of omitting images, kerning, wrapping characters depending on the Web browser, and a technique for selecting the optimal size of a character font for display according to a surface area of a display screen (see, e.g., Japanese Patent Application Publication No. 2002-156957 (paragraph [0065], FIG. 15).

DISCLOSURE OF THE INVENTION

However, depending on the Web browser, even with images omitted, kerning done, characters wrapped, the small screen of a PDA or the like can display only a part of a whole page at a time, anyway. Further, even using the technique for selecting an optimal size of a character font for display according to the surface area of a display screen, there also is a limit in the number of characters displayable on a single screen, and further, small characters would cause an adverse effect of making reading difficult.

The present invention has been made to overcome these problems, and has an object to provide a Web-enabled electronics apparatus, a Web page processing method, and a program, which can display a Web page acquired through a network by reconstruction into pages suitable for browsing in a low-resolution display environment, and reconstruct Web pages written in various types of languages at low costs.

In order to achieve the above object, a Web-enabled electronics apparatus of the present invention includes Web page acquiring means for acquiring a first Web page including at least a headline and a body of story related to the headline, and Web page reconstructing means for extracting the body of story from the first Web page acquired by the Web page acquiring means to create a second Web page including this body of story, and extracting the headline from the first Web page to create a third Web page including this headline and provided with a link to the second Web page.

That is, this Web-enabled electronics apparatus has enabled browsing of the first Web page acquired via a network and including a headline and a body of story related to this headline, on separate screens by division into a headline Web page (the third Web page) provided with a link to the body of story, and a body-of-story Web page (the second Web page). As a result, it has become possible to efficiently browse the content of the whole part of a high-resolution Web page designed for personal computers without scrolling or with a small amount of scrolling in poor (low-resolution) display environments of mobile terminals such as PDAs.

Further, in a case where the headline of the first Web page is constituted by a headline and subheads, and its body of story is constituted by a body of story of the headline and a list of links to articles belonging to the subheads, a page of the body of story of the headline and a list page providing links to articles belonging to the subheads are created as the third Web page, and a page including the headline provided with a link to its body of story and the subheads provided with links to the link list page is created as the second Web page. As a result, if a headline is designated on the third Web page, a page of the body of story of that headline can be displayed, and when a subhead is designated, the list page providing links to articles belonging to that subhead can be displayed. Since each of the Web pages is provided in a manner having certain regularity as a whole, the user can eliminate trial and error in his or her operation for reaching a target Web page, whereby Web browsing straight to the content itself of the Web page becomes possible.

Further, in the Web-enabled electronics apparatus of the present invention, the Web page reconstructing means includes display element position judging means for internally depicting the first Web page and judging positions of individual display elements on the first Web page on the basis of this depicted data, cluster classifying means for connecting closely related ones of the individual display elements in terms of layout together on the basis of the judged positions of the display elements for classification into several clusters, specific cluster discriminating means for detecting layout features of the individual clusters and discriminating clusters of the headline and of the body of story on the first Web page from the other clusters on the basis of a result of this feature detection, and means for forming groups each including clusters having a same character attribute which is a display element, calculating an average of numbers of characters within the respective clusters included in each of the groups, and determining a group having a high average as the body of story and a group having a low average as the headline, as to the discriminated clusters of the headline and of the body of story.

Although there are various types of Web page description languages, such as HTML, XHTML, XML+CSS, according to the present invention, Web pages can be reconstructed as long as they are described in page description languages being interpretable and renderable, and thus costs required for page reconstruction can be suppressed compared with a Web page reconstructing method involving a semantics-based analysis of tags.

Furthermore, in the Web-enabled electronics apparatus of the present invention, the specific cluster discriminating means determines a vertical line on a page which crosses a largest number of the display elements as a center-of-gravity line, judges layout features of the individual clusters from at least any of leftward, rightward, middle, using this determined center-of-gravity line as a reference, and discriminates clusters with a feature thereof judged as being middle from the other clusters as the clusters of the headline and of the body of story.

In most Web pages, major content is laid out in the middle of a horizontal axis of a page. The vertical line on the page which crosses the largest number of display elements can be considered as a position on the horizontal axis on the page wherein the major content is laid out, and if the layout features of individual clusters are judged from at least any of leftward, rightward, middle, setting this vertical line as a center-of-gravity line and using this center-of-gravity line as a reference, then it is possible to discriminate clusters with their feature judged as being middle from the other clusters as clusters of a headline and of a body of story with high accuracy.

Further, a Web page processing method according to another aspect of the present invention is a Web page processing method for a Web-enabled electronics apparatus having a processing/computation section and a display section for displaying Web pages, which method includes a step of acquiring a first Web page including at least a headline and a body of story related to this headline through a network, a step of extracting the body of story from the acquired first Web page by processing/computing by the processing/computation section to create a second Web page including this body of story, and a step of extracting the headline from the first Web page by processing/computing by the processing/computation section to create a third Web page including this headline and provided with a link to the second Web page.

That is, the Web page processing method of this invention has enabled browsing of the first Web page acquired through a network and including a headline and a body of story related to this headline, on separate screens by division into a headline Web page (the third Web page) provided with a link to the body of story, and a body-of-story Web page (the second Web page). As a result, it has become possible to efficiently browse the content of the whole part of a high-resolution Web page designed for personal computers without scrolling or with a small amount of scrolling in poor (low-resolution) display environments of mobile terminals such as PDAs.

Further, in the Web page processing method of the present invention, the processing/computation section is configured to internally depict the first Web page, judge positions of individual display elements on the first Web page on the basis of this depicted data, connect closely related ones of the individual display elements in terms of layout together on the basis of the judged positions of the display elements for classification into several clusters, detect layout features of the individual clusters and discriminate clusters of the headline and of the body of story on the first Web page from the other clusters on the basis of a result of this feature detection, form groups each including clusters having a same character attribute which is a display element, calculate an average of numbers of characters within the respective clusters included in each of the groups, and determine a group having a high average as the body of story and a group having a low average as the headline, as to the discriminated clusters of the headline and of the body of story.

Therefore, according to the present invention, Web pages can be reconstructed as long as they are described in page description languages being interpretable and renderable, and thus costs required for page reconstruction can be suppressed compared with a Web page reconstructing method involving a semantics-based analysis of tags.

Furthermore, in the Web page processing method of the present invention, the processing/computation section is configured to determine a vertical line on a page which crosses a largest number of the display elements as a center-of-gravity line, judge layout features of the individual clusters from at least any of leftward, rightward, middle, using this determined center-of-gravity line as a reference, and discriminate clusters with a feature thereof judged as being middle from the other clusters as the clusters of the headline and of the body of story.

The vertical line on the page which crosses the largest number of display elements can be considered as a position on the above-mentioned horizontal axis on the page wherein the major content is laid out, and if the layout features of individual clusters are judged from at least any of leftward, rightward, middle, setting this vertical line as a center-of-gravity line and using this center-of-gravity line as a reference, then it becomes possible to discriminate clusters with their feature judged as being middle from the other clusters as clusters of a headline and of a body of story with higher accuracy.

Furthermore, a program according to another aspect of the present invention is to cause a computer to function as a Web page acquiring means for acquiring a first Web page including at least a headline and a body of story related to this headline, and a Web page reconstructing means for extracting the body of story from the first Web page acquired by the Web page acquiring means to create a second Web page including this body of story, and extracting the headline from the first Web page to create a third Web page including this headline and provided with a link to the second Web page.

According to the program of this invention, it has enabled to browse the first Web page acquired via a network and including a headline and a body of story related to this headline, on separate screens by division into a headline Web page (the third Web page) provided with a link to the body of story, and a body-of-story Web page (the second Web page). As a result, it has become possible to efficiently browse the content of the whole part of a high-resolution Web page designed for personal computers without scrolling or with a small amount of scrolling in poor (low-resolution) display environments of mobile terminals such as PDAs.

Further, in the program of this invention, the Web page reconstructing means causes the computer to function as display element position judging means for internally depicting the first Web page and judging positions of individual display elements on the first Web page on the basis of this depicted data, cluster classifying means for connecting closely related ones of the display elements in terms of layout together on the basis of the judged positions of the display elements for classification into several clusters, specific cluster discriminating means for detecting layout features of the individual clusters and discriminating clusters of the headline and of the body of story on the first Web page from the other clusters on the basis of a result of this feature detection, and means for forming groups each including clusters having a same character attribute which is a display element, calculating an average of numbers of characters within the respective clusters included in each of the groups, and determining a group having a high average as the body of story and a group having a low average as the headline, as to the discriminated clusters of the headline and of the body of story.

According to the present invention, Web pages can be reconstructed as long as they are described in page description languages being interpretable and renderable, and thus costs required for page reconstruction can be suppressed compared with a Web page reconstructing method involving a semantics-based analysis of tags.

Furthermore, in the program of the present invention, the specific cluster discriminating means is characterized as causing the computer to function as means for determining a vertical line on a page which crosses a largest number of the display elements as a center-of-gravity line, judging layout features of the individual clusters from at least any of leftward, rightward, middle, using this determined center-of-gravity line as a reference, and discriminating clusters with a feature thereof judged as being middle from the other clusters as the clusters of the headline and of the body of story.

According to the present invention, it becomes possible to discriminate clusters with their feature judged as being middle as clusters of a headline and of a body of story with high accuracy.

BRIEF DESCRIPTION OF THE DRAWINGS

FIG. 5 is a view showing an example of an original Web page and a result obtained by clustering of each display element performed on the Web page.

BEST MODES FOR CARRYING OUT THE INVENTION

An embodiment of the present invention will be described hereunder with reference to the drawings.

Figure 1:
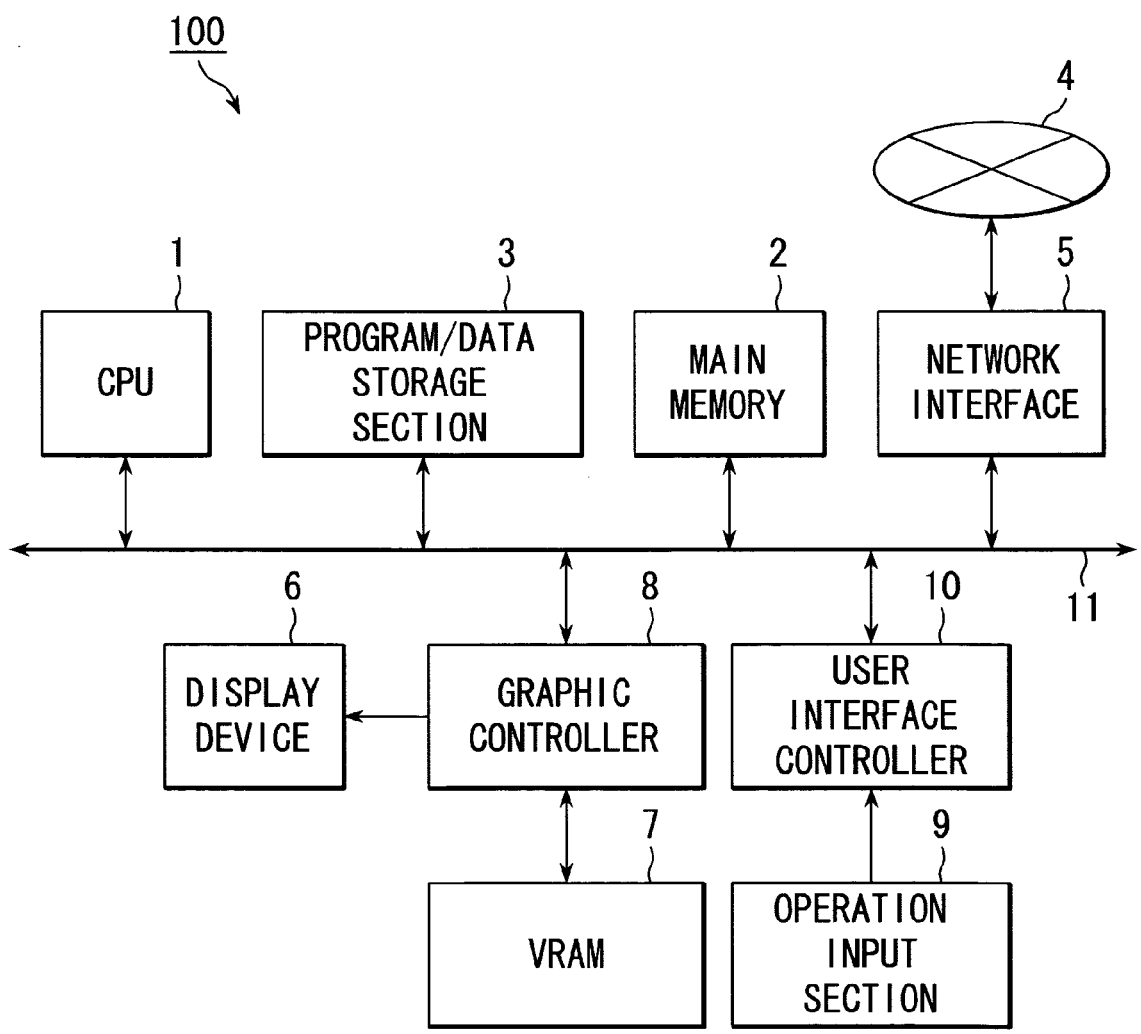
FIG. 1 is a block diagram showing an electrical configuration of a Web-enabled electronics apparatus according to an embodiment of the present invention.

FIG. 1 is a block diagram showing an electrical configuration of a Web-enabled electronics apparatus according to an embodiment of the present invention.

As shown in the figure, this Web-enabled electronics apparatus 100 has a CPU (Central Processing Unit) 1 as a processing/computation section, a main memory 2, a program/data storage section 3, a network interface section 5 that processes connection to a network 4 such as the Internet, a display device 6 that provides information visually to a user, a graphic controller 8 that performs a rendering process to a screen of the display device 6 using a VRAM (video RAM) 7, a user interface controller 10 that processes input from a user's operation input section 9 such as a jog dial, and a bus 11 for transmitting signals among the above parts.

The CPU 1 performs various computation processing and control using the main memory 2 as a work area, based on programs and data stored in, e.g., the program/data storage section 3, input from the operation input section 9 by the user, and the like. The main memory 2 comprises a randomly readable and writable, high-speed memory, such as, e.g., a RAM (Random Access Memory). The program/data storage section 3 is a read-only or readable/writable, nonvolatile storage device, and is, e.g., a ROM (Read Only Memory), a flash ROM, a disk drive, or the like.

The display device 6 is, specifically, a CRT (Cathode Ray Tube), an LCD (Liquid Crystal Display), a PDP (Plasma Display Panel), an OEL (Organic Electroluminescence), or the like. The user's operation input section 9 is, specifically, a simple keyboard, an IR (Infrared) remote controller, a jog dial, push buttons, or the like.

The network interface section 5 may be e.g., an analog modem, LAN (Local Area Network), ISDN (Integrated Services Digital Network), ADSL (Asymmetric Digital Subscriber Line), FTTH (Fiber-To-The-Home), Bluetooth®, FOMA (W-CDMA), or the like.

This Web-enabled electronics apparatus 100 is provided with a function of reconstructing an acquired Web page into a form tailored to a display environment such as the resolution of its own display device, for displaying and browsing.

The program/data storage section 3 stores a basic program such as an OS (Operating System) for operating this Web-enabled electronics apparatus 100, as well as a page reconstructing program that executes reconstruction of Web pages under this basic program, a Web browser, and the like. These programs are loaded into the main memory 2 for interpretation, execution by the CPU 1.

Figure 2:
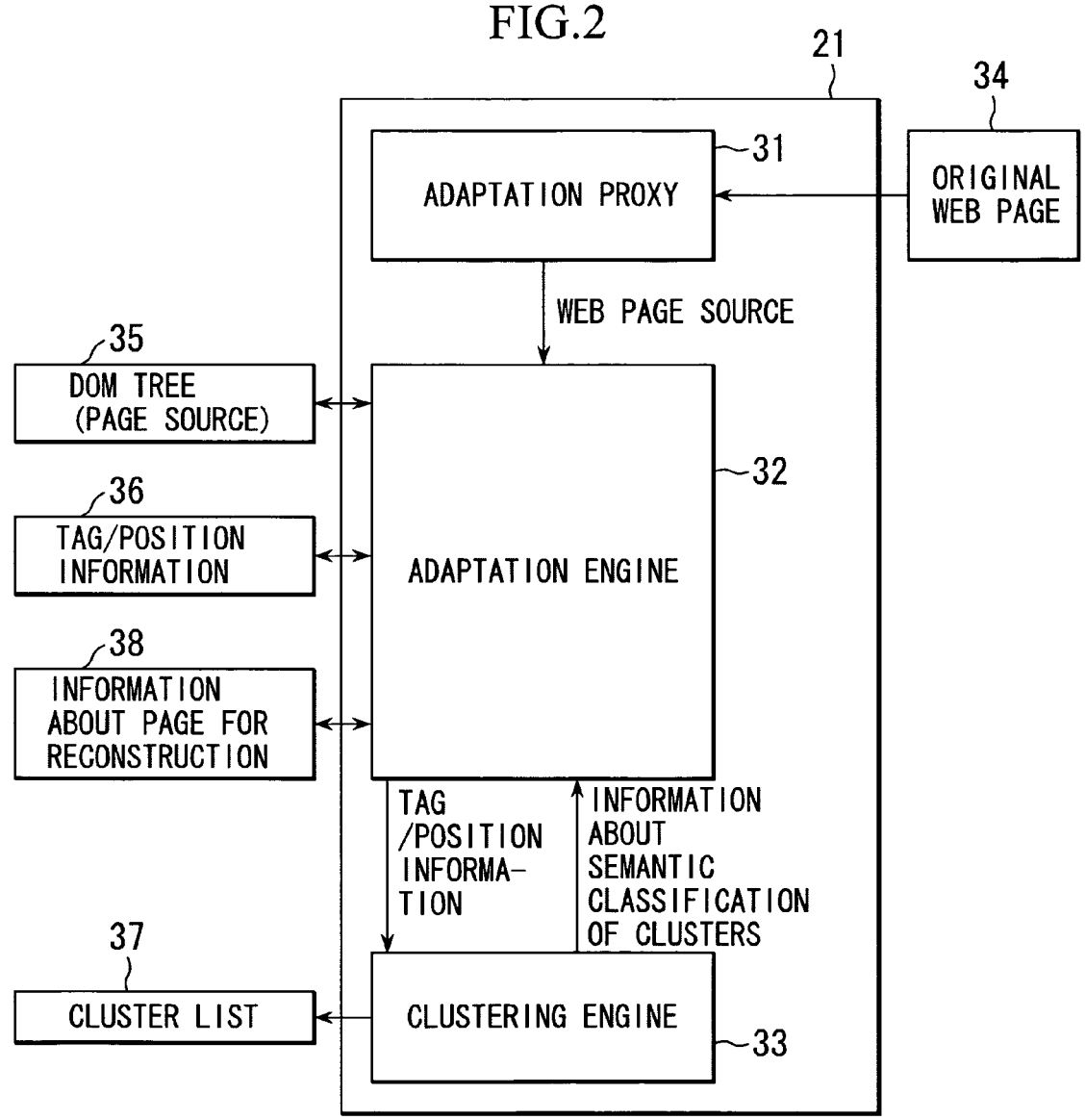
FIG. 2 is a diagram showing a configuration of modules of a page reconstructing program.

FIG. 2 is a diagram showing a configuration of modules of the aforementioned page reconstructing program. As shown in the figure, a page reconstructing program 21 is constituted by an adaptation proxy 31, an adaptation engine 32, and a clustering engine 33.

Figure 3:
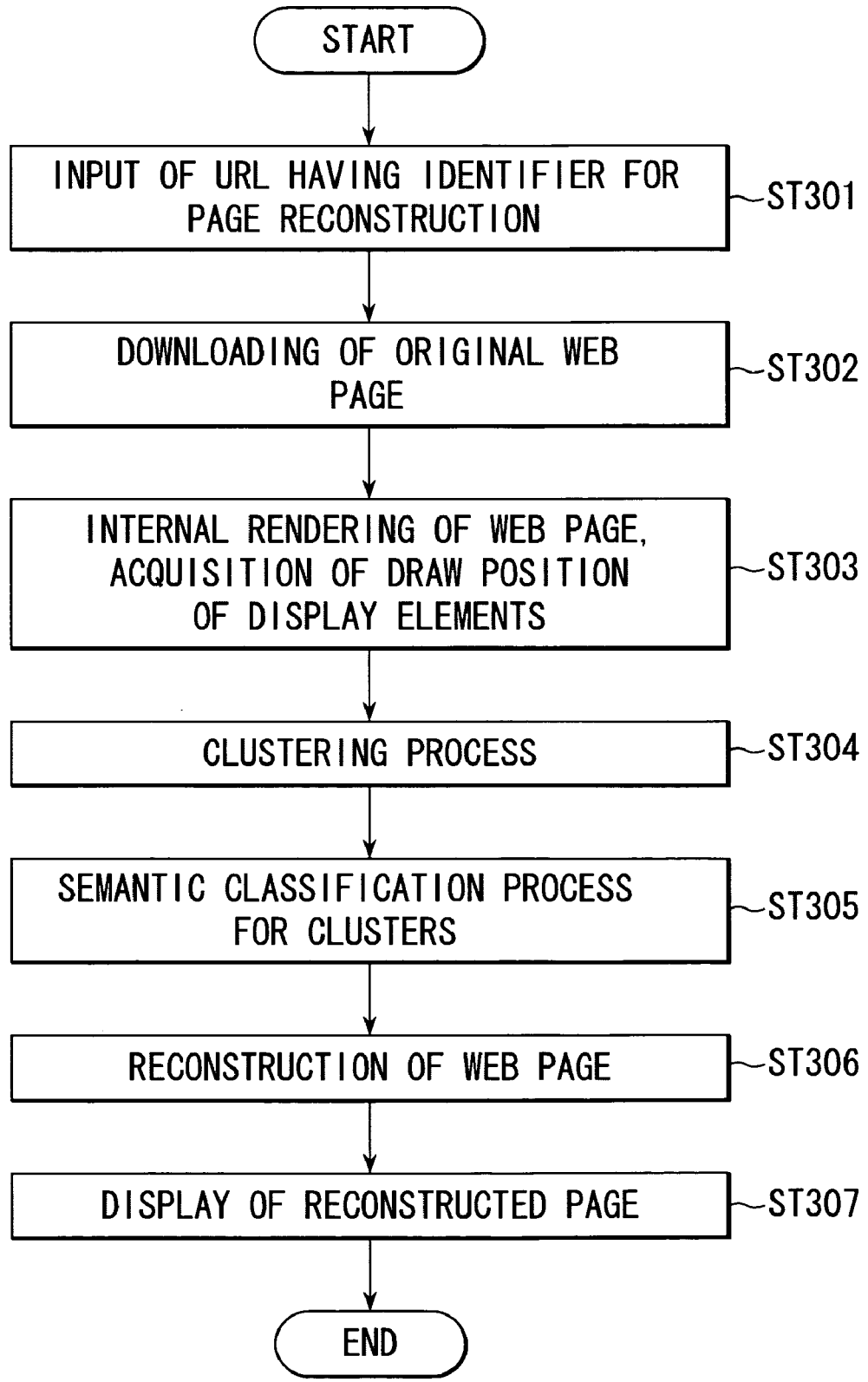
FIG. 3 is a flowchart showing a procedure of the page reconstructing program.

Next, the procedure of this page reconstructing program 21 will be described. FIG. 3 is a flowchart showing a procedure of this page reconstructing program 21. Note that a mobile terminal 100 such as a PDA is considered herein as an example of the Web-enabled electronics apparatus 100.

Figure 4:
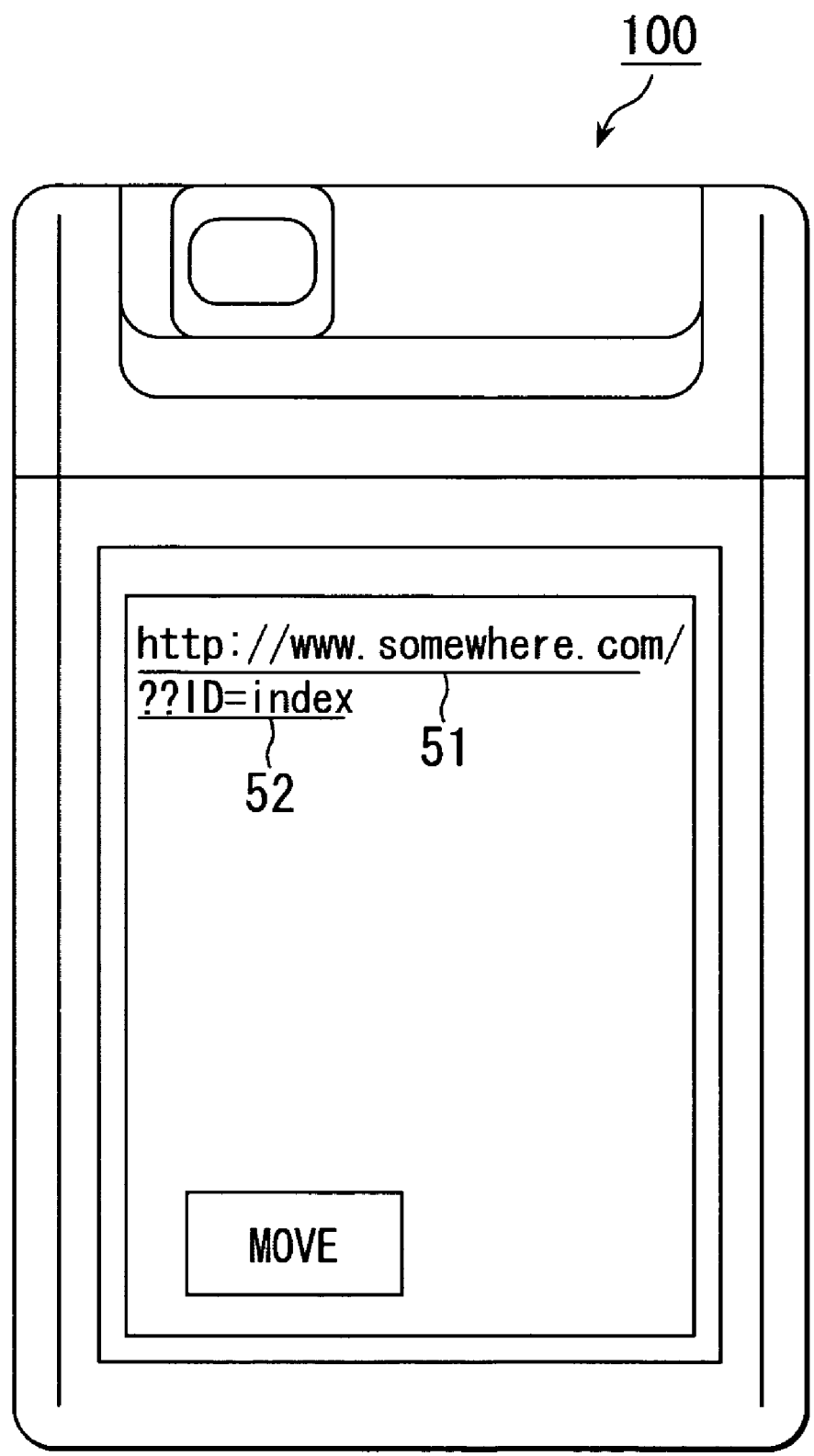
FIG. 4 is a view showing an input state of a URL to which an identifier for page reconstruction is appended in a mobile terminal.

First, in this mobile terminal 100, a URL is inputted by the user. At this time, as shown in FIG. 4, an identifier (example: "/??ID=index") 52 for page reconstruction is appended to the end of a URL (example: http://www.somewhere.com) 51, and then a page browsing request is inputted, whereby this request is given to the page reconstructing program as a request for page reconstruction (ST301).

In response to the request for page reconstruction, the page reconstructing program 21 starts the adaptation proxy 31, and delivers the URL thereto. The adaptation proxy 31 downloads an original Web page 34 via the Internet in accordance with the URL, for delivery to the adaptation engine 32 (ST302).

The adaptation engine 32 stores a source code of the acquired Web page 34 in the main memory 2 in the form of a DOM (Document Object Model) tree 35, and internally renders (does not display) the Web page. Successively, the adaptation engine 32 finds the draw positions of display elements such as character strings and images on the Web page of interest, and stores the position information in combination with tags as tag/position information 36 in the main memory (ST303). Note that the draw positions of the display elements change depending on the size of a character font, the number of characters, the size of an image, and thus that the draw positions are found taking into account the size of a character font, the number of characters, and the like for characters, and the size of an image, and the like for images.

The DOM tree means a tree structure in which elements such as tags, characters, images of a whole page are made hierarchical to enable one to, e.g., search, edit the page using an application. Further, a DOM is an API (Application Programming Interface) for accessing XML (extensible Markup Language) documents as a set of node objects in a tree structure. APIs for XML documents include a SAX (Simple API for XML) besides the DOM.

Thereafter, the adaptation engine 32 delivers the tag/position information 36 to the clustering engine 33 to instruct the clustering engine 33 to perform clustering. The clustering engine 33 classifies tags (display elements) on the Web page into several clusters by connecting visually closely related (close in distance) tags (display elements) together based on the tag/position information 36 (ST304), and stores information about the classified clusters in the main memory 2 as a cluster list 37.

Reference character 70 of FIG. 5 denotes a result obtained from the clustering of display elements 61a to 61l performed on an original Web page 60. Reference characters 71a to 71l denote individual clusters: 71b denotes a cluster of the headline 61b on the Web page; 71c denotes a cluster of the body of story 61c of the headline; 71f, 71h, 71j denote clusters of the subheads 61f, 61h, 61j, respectively; 71g, 71i, 71k denote clusters of portions of the lists 61g, 61i, 61k of articles belonging to the subheads, respectively. Since having no visual relation with the other display elements, the headline 61b and the subheads 61f, 61h, 61j are generated as the individual clusters 71b, 71f, 71h, 71j, respectively. Further, the article lists 61g, 61i, 61k are generated as the clusters 71g, 71i, 71k, respectively, with one list being provided for each set belonging to a single subhead. Other than this, some display information is obtained as the clusters 71a, 71d, 71l.

Clustering techniques include a grid-based technique known in the field of 2D data mining.

Successively, the clustering engine 33 extracts layout features from the individual, generated clusters 71a to 71l to give them meanings in terms of layout.

Figure 6:
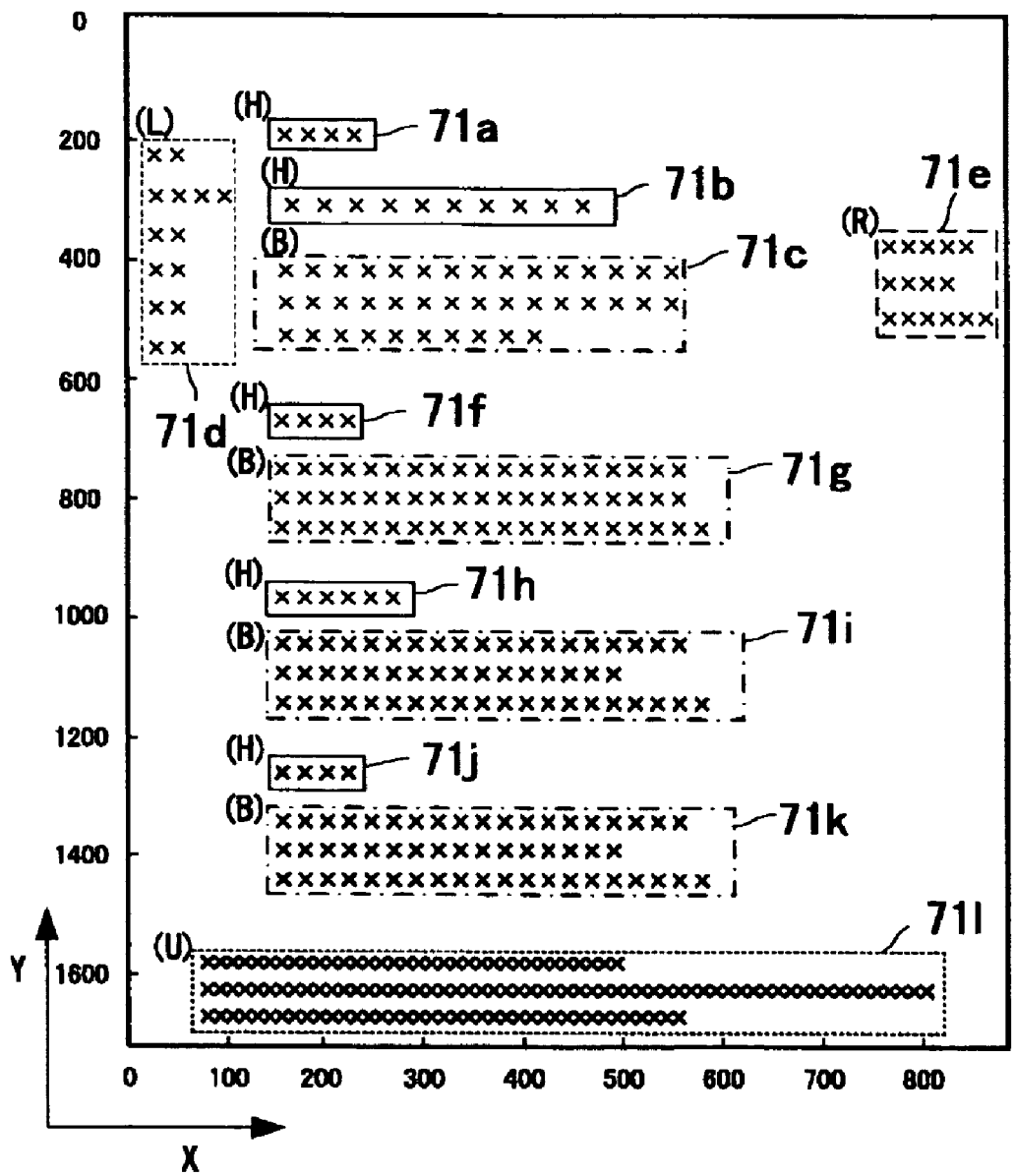
FIG. 6 is a view showing a result obtained by classification depending on meaning of a cluster in terms of layout.

That is, as shown in FIG. 6, the clustering engine 33 classifies the individual clusters 71a to 71l into five types of meanings, i.e., "leftward" (L), "rightward" (R), "headline (including subheads)" (H), "body (including links to articles)" (B), "unused" (U) (ST305), and delivers the result to the adaptation engine 32. Details of this classification of clusters will be described later.

Returning to FIG. 2, the adaptation engine 32 reconstructs the Web page in accordance with the classification result of the clusters (ST306), and stores reconstructed page information 38 in the main memory 2.

Thereafter, the Web browser reads the reconstructed page information 38 stored in the main memory 2 for display on the screen of the display device 6 (ST307).

Next, the details of the method of classifying clusters will be described.

Figure 7:
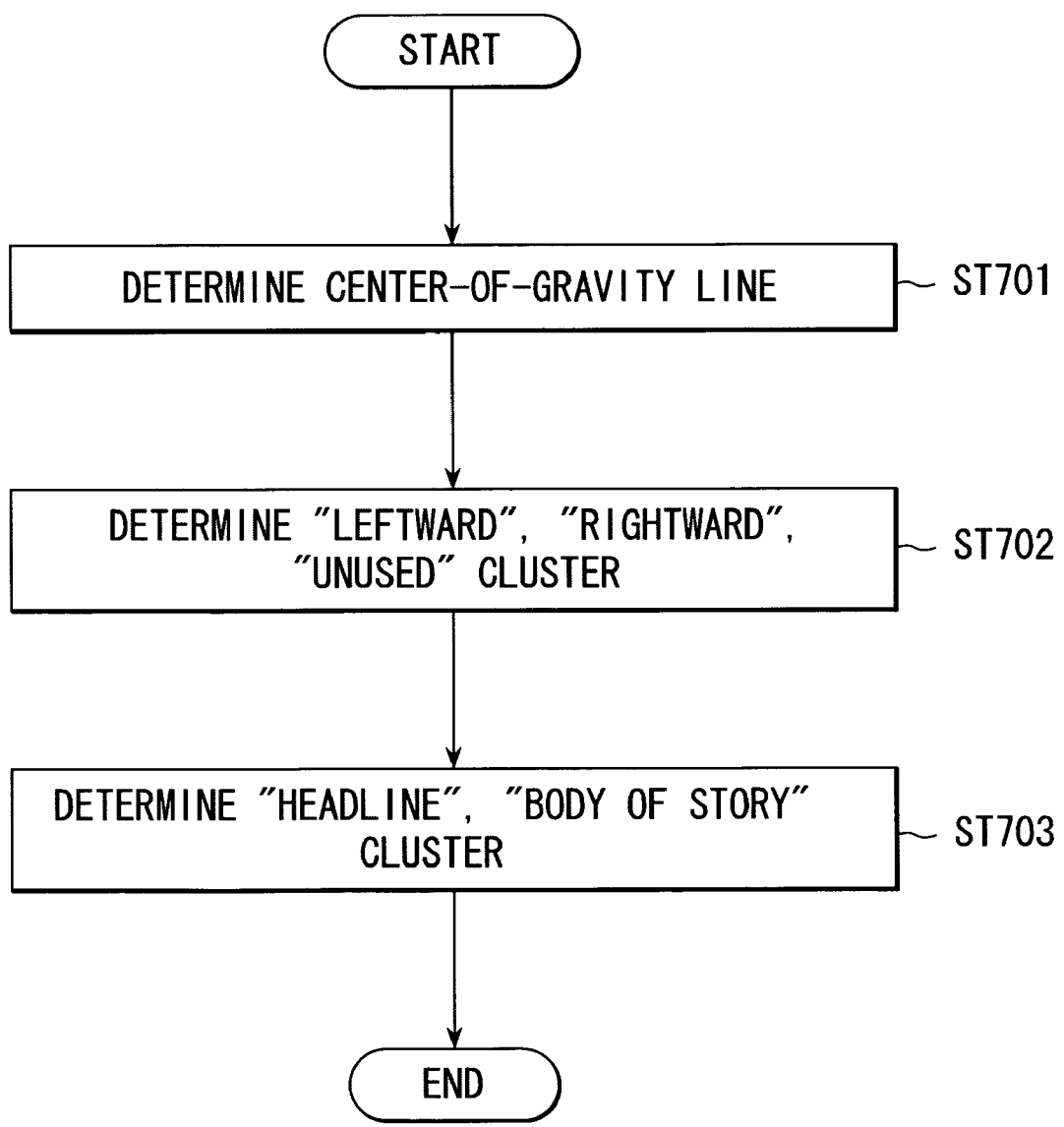
FIG. 7 is a flowchart showing a procedure for classifying clusters.
Figure 8:
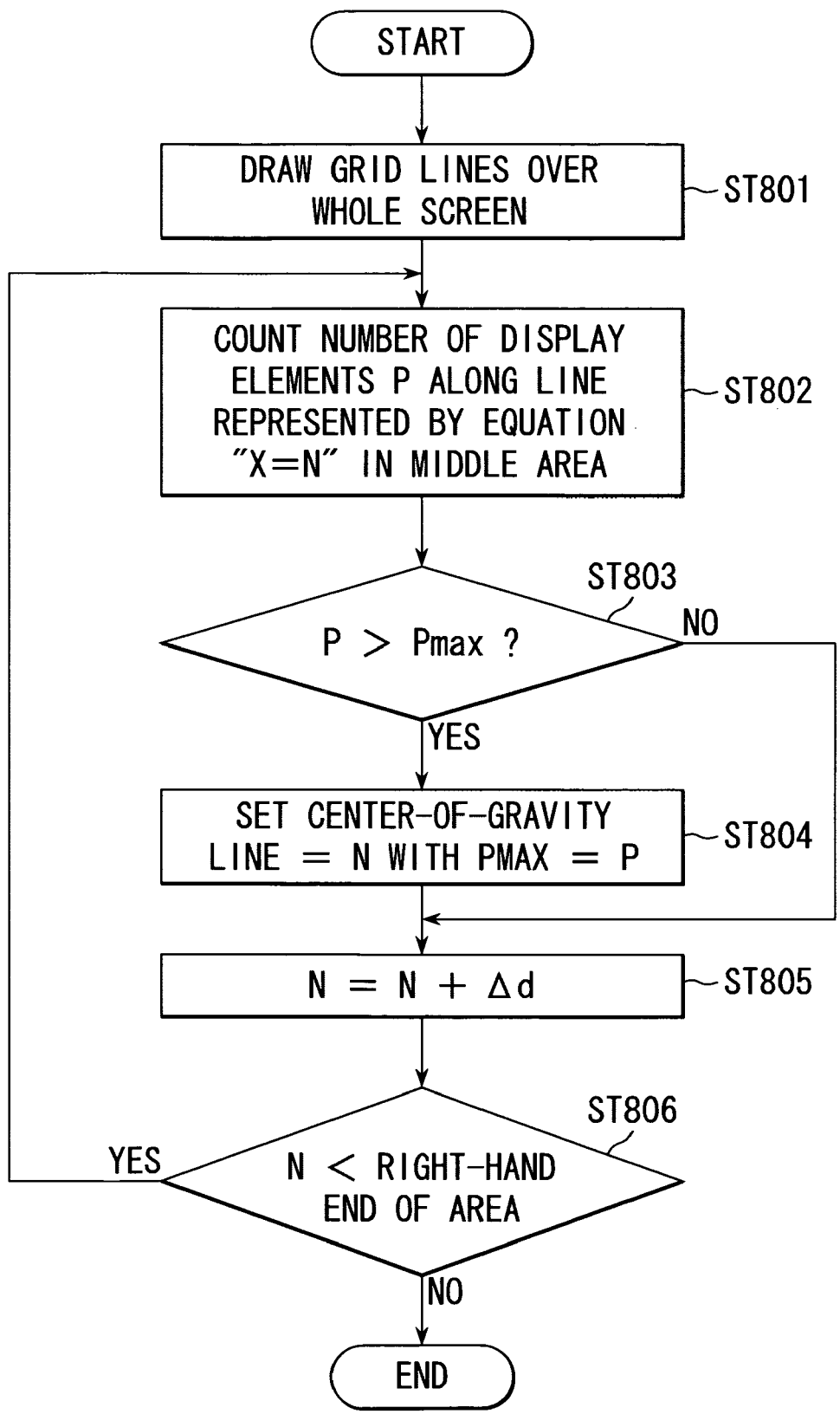
FIG. 8 is a flowchart showing a procedure for determining a center-of-gravity line in the procedure for classifying clusters of FIG. 7.
Figure 9:
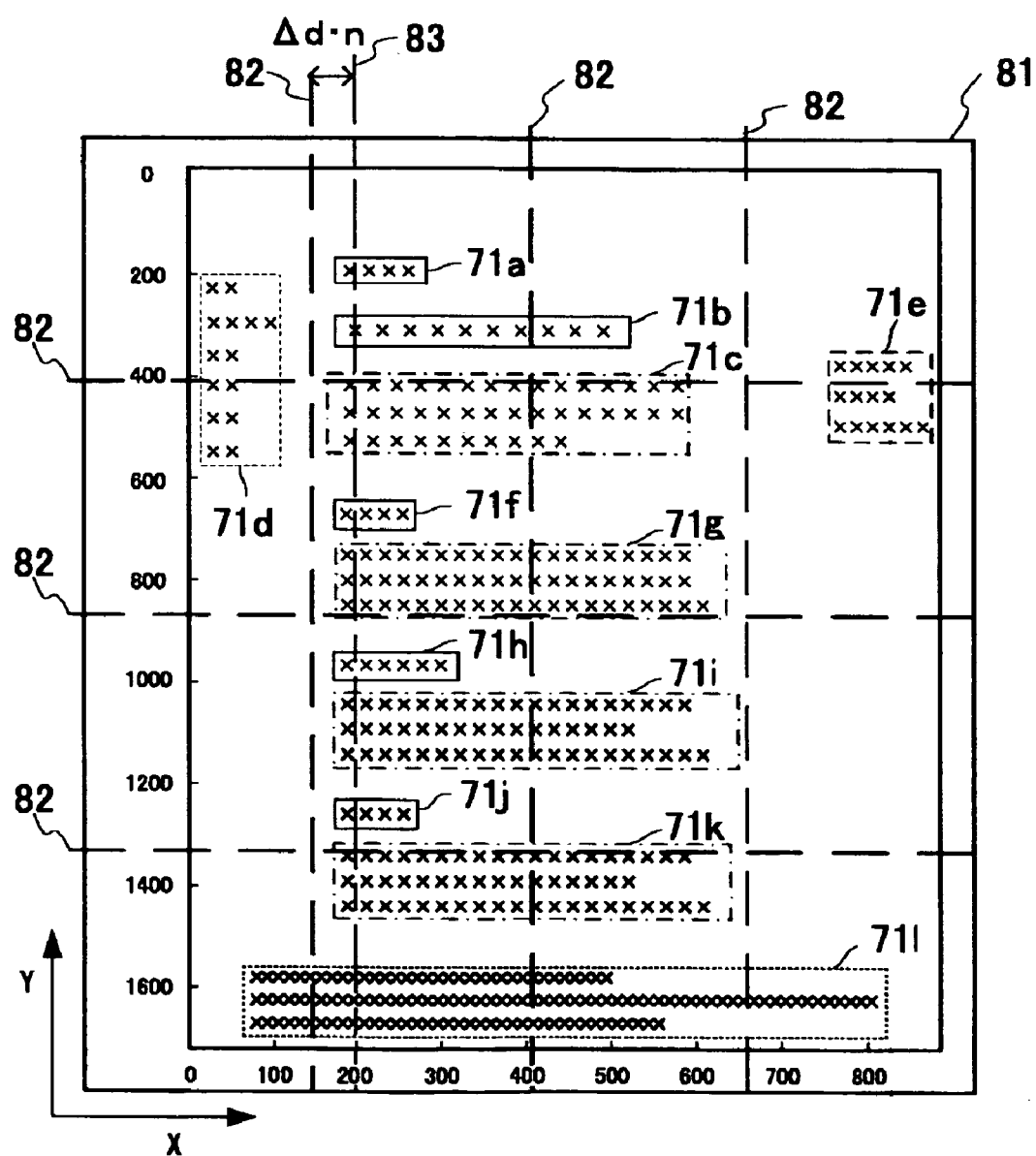
FIG. 9 is a view showing a specific example of determination of the center-of-gravity line.
Figure 10:
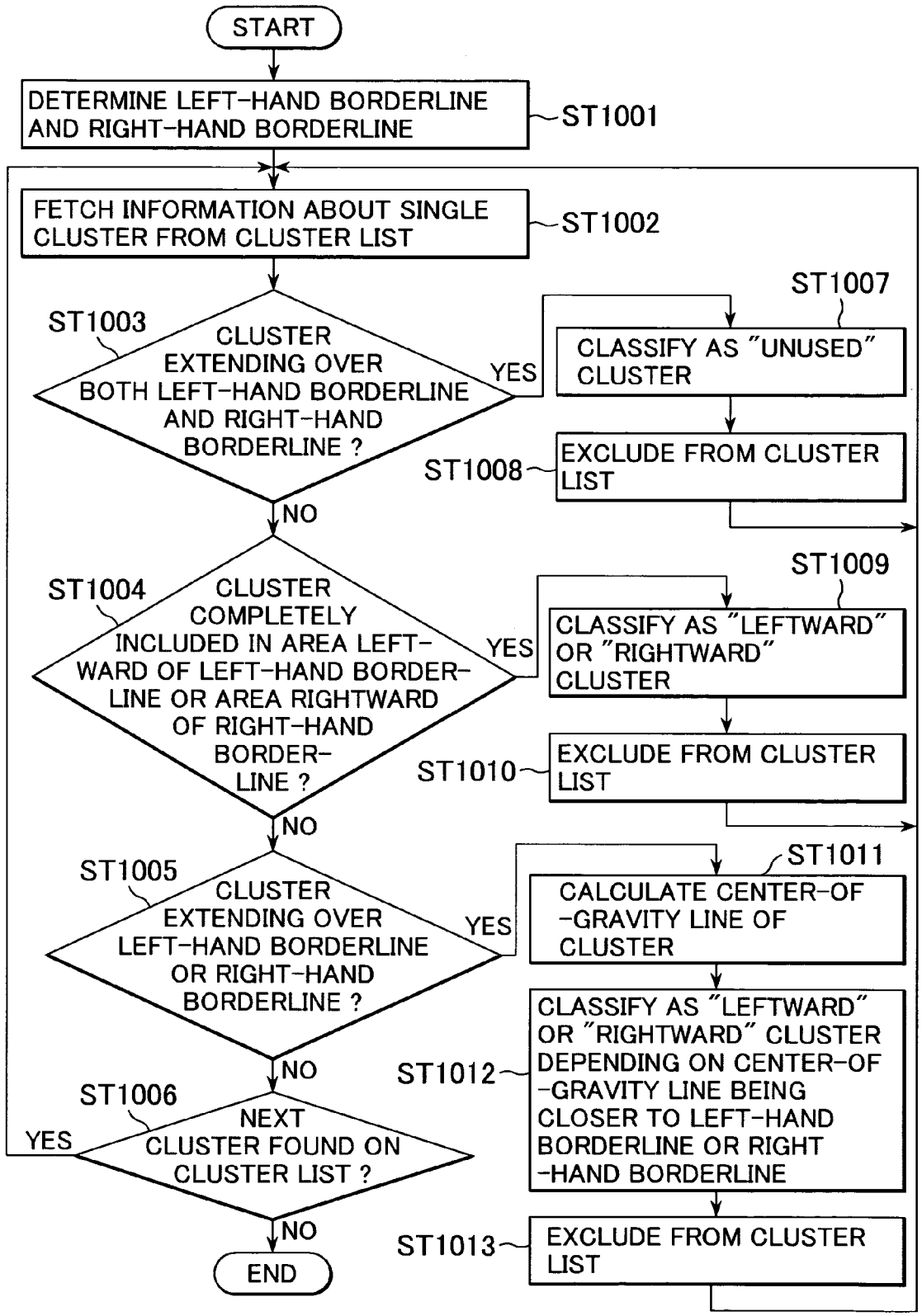
FIG. 10 is a flowchart showing a procedure for determining a meaning given to a cluster in terms of layout from among "leftward", "rightward", "unused" in the procedure for classifying clusters of FIG. 7.
Figure 11:
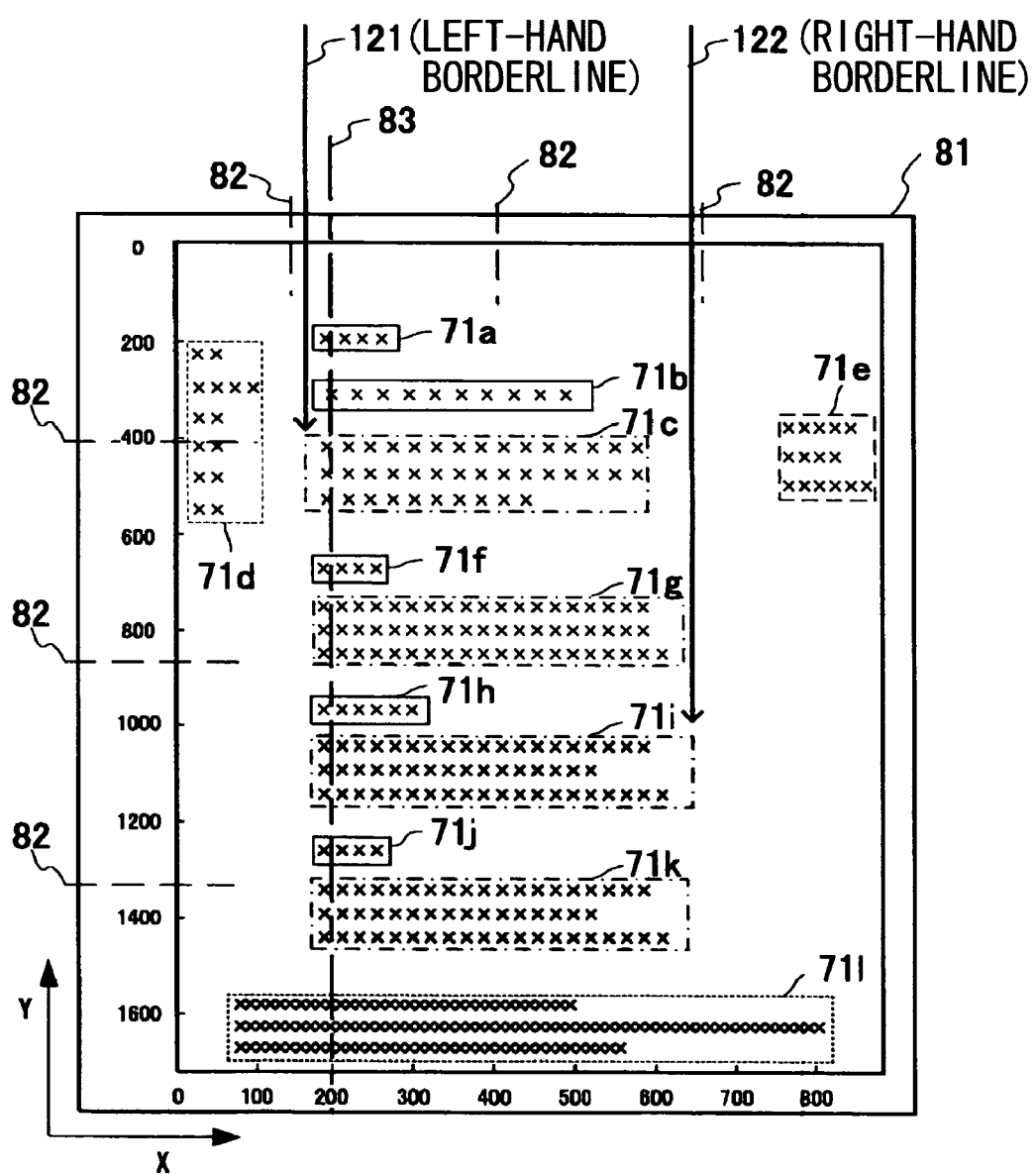
FIG. 11 is a view showing a specific example of a process of determining the meaning given to the cluster in terms of layout of FIG. 10.
Figure 12:
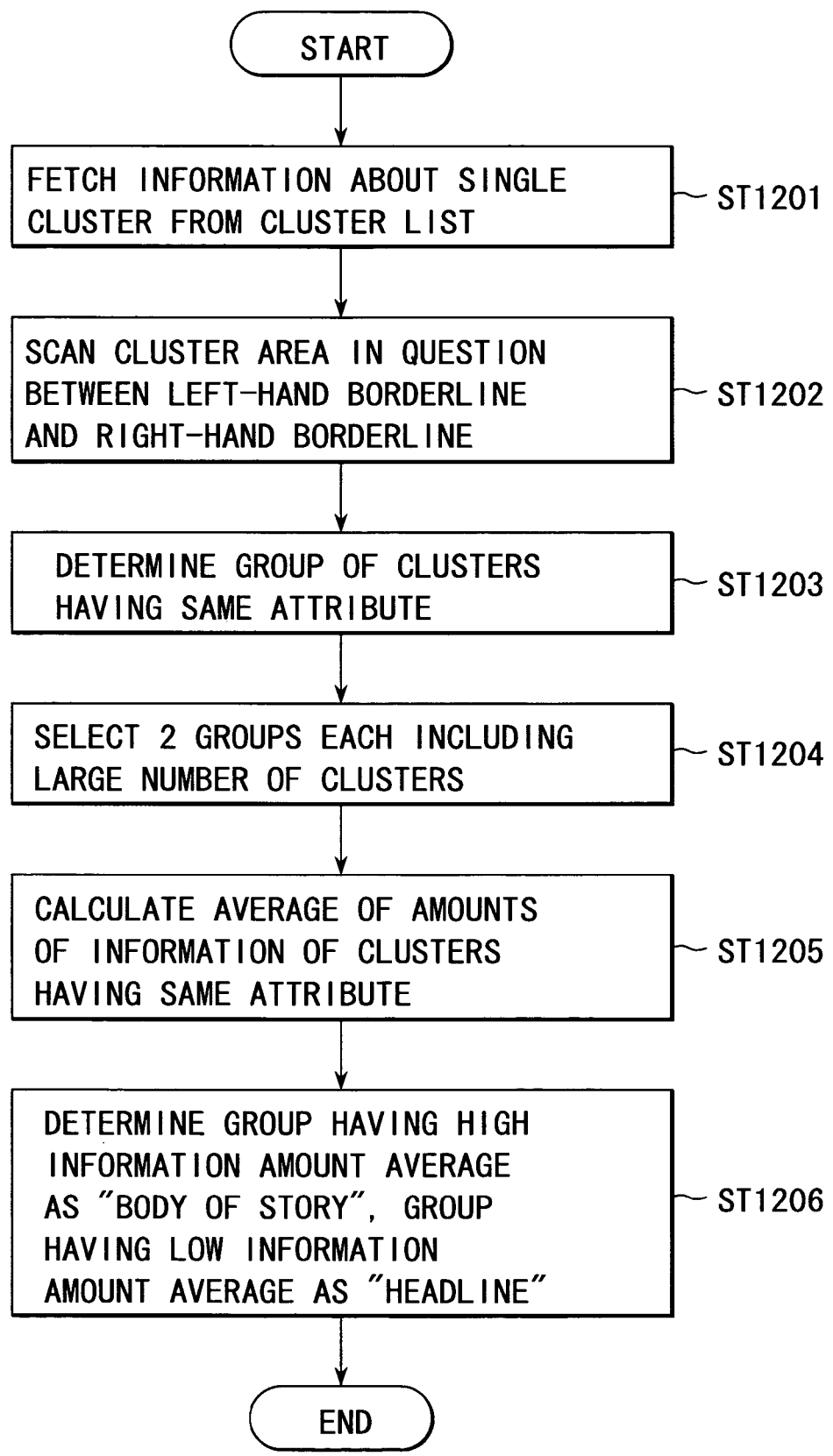
FIG. 12 is a flowchart showing a procedure for determining the meaning given to the cluster in terms of layout from among "headline (including subheads)", "body (including links to articles)" in the procedure for classifying clusters of FIG. 7.

FIG. 7 is a flowchart showing a procedure for classifying clusters; FIG. 8 is a procedure for determining a center-of-gravity line in the procedure for classifying clusters of FIG. 7; FIG. 9 is a specific example of determination of the center-of-gravity line; FIG. 10 is a procedure for determining a meaning given to a cluster in terms of layout from among "leftward", "rightward", "unused" in the procedure for classifying clusters of FIG. 7; FIG. 11 is a specific example of a process of determining a meaning given to a cluster in terms of layout of FIG. 10; FIG. 12 is a procedure for determining a meaning given to a cluster in terms of layout from among "headline (including subheads)", "body (including links to articles)" in the procedure for classifying clusters of FIG. 7.

First, in ST701 of FIG. 7, the clustering engine 33 determines a center-of-gravity line of a page screen, which serves as a reference for detecting the layout feature of each of the clusters. The center-of-gravity line means a line along which the largest number of display elements is arranged on a page screen and which extends along the Y axis.

As shown by, e.g., the procedure of FIG. 8 and the specific example of FIG. 9, a specific method of determining the center-of-gravity line is as follows. First, grid lines 82 are set which equally divide the whole of a page screen 81 which has been clustered, into, e.g., 16 (4×4) areas (ST801). As to, e.g., 4 (2×2) areas in the middle of the page, the number of display elements (P) present is counted for each of lines extending in the Y-axis direction at predetermined intervals (Δd) from either the left or right end (in the X-axis direction) (ST802), to determine a line extending in the Y-axis direction for which a maximum count Pmax is obtained, as a center-of-gravity line 83 (ST803-806).

After having determined the center-of-gravity line 83 in this way, in ST702 of FIG. 7, a process of determining the meanings given to the individual clusters in terms of layout from among "leftward", "rightward", "unused" is performed. As shown by, e.g., the procedure of FIG. 10 and the specific example of FIG. 11, a specific method for this process is as follows. First, in, e.g., upper 12 (4×3) areas of the 16 (4×4) areas divided by the grid lines 82, of the clusters 71a, 71b, 71c, 71f, 71g, 71h, 71i, 71j, 71k crossing the center-of-gravity line 83, a line 121 extending in the Y-axis direction which takes the X coordinate of the left end of the most leftwardly projecting cluster (having the minimum X coordinate) (71c in this example) is judged as a left-hand borderline, and a line 122 extending in the Y-axis direction which takes the X-coordinate of the right end of the most rightwardly projecting cluster (having the minimum X coordinate) (71*i* in this example) is judged as a right-hand borderline (ST1001). As a result, the whole of the page screen 81 is divided into three areas with the left-hand and right-hand borderlines 121, 122 as boundaries.

Thereafter, the clustering engine 33 fetches information about a single cluster from the cluster list 37 (ST1002). This cluster information includes information about a display element constituting this cluster (tag, position information). The clustering engine 33 determines a meaning given to the cluster in terms of layout from among "leftward", "rightward", "unused", based on this cluster information, as follows.

First, if the cluster extends over both the left-hand borderline 121 and the right-hand borderline 122 (YES at ST1003), the clustering engine 33 classifies that cluster as an "unused" cluster (ST1007), and excludes it from the cluster list 37 (ST1008).

In a case where the cluster is completely included in an area leftward of the left-hand borderline 121 (YES at ST1004), then the clustering engine 33 classifies that cluster as a "leftward" cluster (ST1009), and in a case where the cluster is completely included in an area rightward of the right-hand borderline 122 (YES at ST1004), then the clustering engine 33 classifies that cluster as a "rightward" cluster (ST1009), and excludes it from the cluster list 37 (ST1010).

Further, in a case where the cluster is not completely included in the left-hand area of the left-hand borderline 121 (NO at ST1004) but crosses either one of the borderlines, the left-hand borderline 121 or the right-hand borderline 122 (YES at ST1005), then the clustering engine 33 calculates a center-of-gravity line of the cluster (ST1011), and classifies the cluster depending on the proximity of the center-of-gravity line to either the left-hand borderline 121 or the right-hand borderline 122, i.e., as a "leftward" cluster in a case where the cluster is closer to the left-hand borderline 121, or as a "rightward" cluster in a case where the cluster is closer to the right-hand borderline 122 (ST1012), and excludes it from the cluster list (ST1013).

The above process is repeated for each one of the clusters registered in the cluster list (ST1006).

Those clusters not classified as any of "leftward", "rightward", "unused" clusters should be any of "headline (including subheads)", and "body of story (including links to articles)" clusters. This cluster classification is performed by a procedure shown in, e.g., FIG. 12.

First, the clustering engine 33 fetches information about a cluster from the cluster list and internally maps it out for rendering over the main memory 2 (ST1201), and then scans an area interposed between the left-hand borderline 121 and the right-hand borderline 122 shown in FIG. 11 (ST1202). Successively, the clustering engine 33 determines clusters having a common display attribute such as the size, color, style of a font, or background color (hereinafter termed "congeneric clusters"), as a group (ST1203).

Next, the clustering engine 33 selects two groups each having a large number of clusters, from the determined groups (ST1204), and calculates, as to each of the groups, an average of the amounts of information, such as the numbers of characters, within its congeneric clusters (ST1205). As a result, a group having a high information amount average (a large number of characters) is determined as a "body of story (including links to articles)", and a group having a low information amount average (a small number of characters) determined as a "headline (including subheads)" (ST1206).

Next, details of the reconstruction of a Web page will be described.

Figure 13:
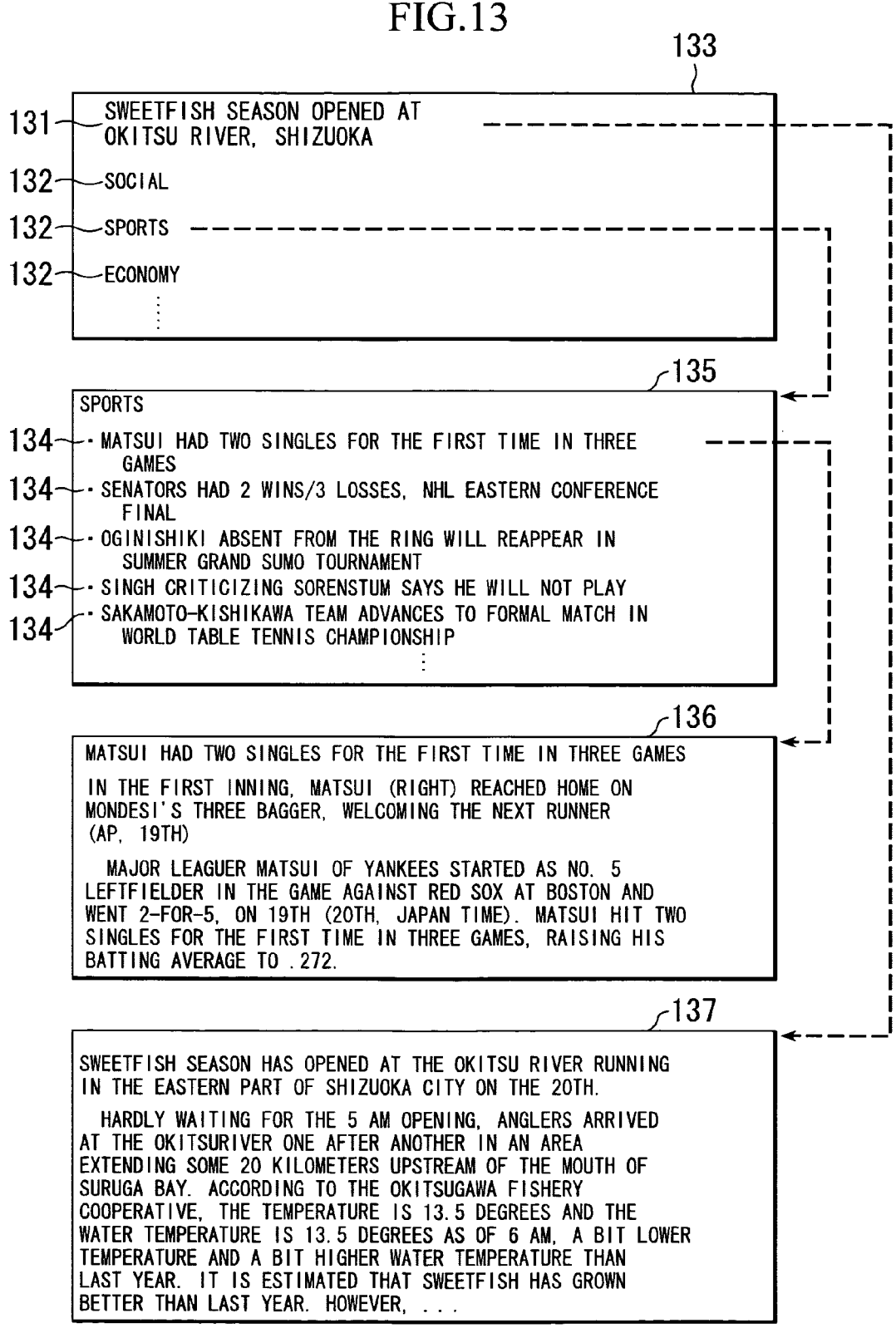
FIG. 13 is a view showing an example of a reconstructed Web page.

The adaptation engine 32 reconstructs, as shown in, e.g., FIG. 13, a top page 133 constituted by a headline 131 and subheads 132, a links-to-articles list page 135 having a group of links 134 to articles belonging to a subhead 132, an article page 136 constituted by the body of story of the headline 131 and articles belonging to a subhead 132, a body-of-story page 137, the body-of-story/article pages 136, 137, and the like.

In the top page 133, in a case where the headline 131 is selected by a user through operation of the jog dial or the like, a hyperlink set for that headline 131 switches the page to a page displaying the body of story/article page 137. Further, in the top page 133, in a case where an arbitrary subhead 132 is selected by the user, a hyperlink set for the selected subhead 132 displays the links-to-articles list page 135 belonging to that subhead 132. Furthermore, when a link 134 to an arbitrary article is selected on this links-to-articles list page 135 by the user, the body of story/article page 136 to which it is linked is displayed. In a case where the user wishes to display other body-of-story/article pages again, the user may return to the top page 133 or the links-to-articles list page 135 by using a return button of the Web browser or the like, and repeat a similar operation.

The layout of these pages is set optimally for the display environment of the mobile terminal, such as the size, resolution of its display screen, beforehand.

Figure 14:
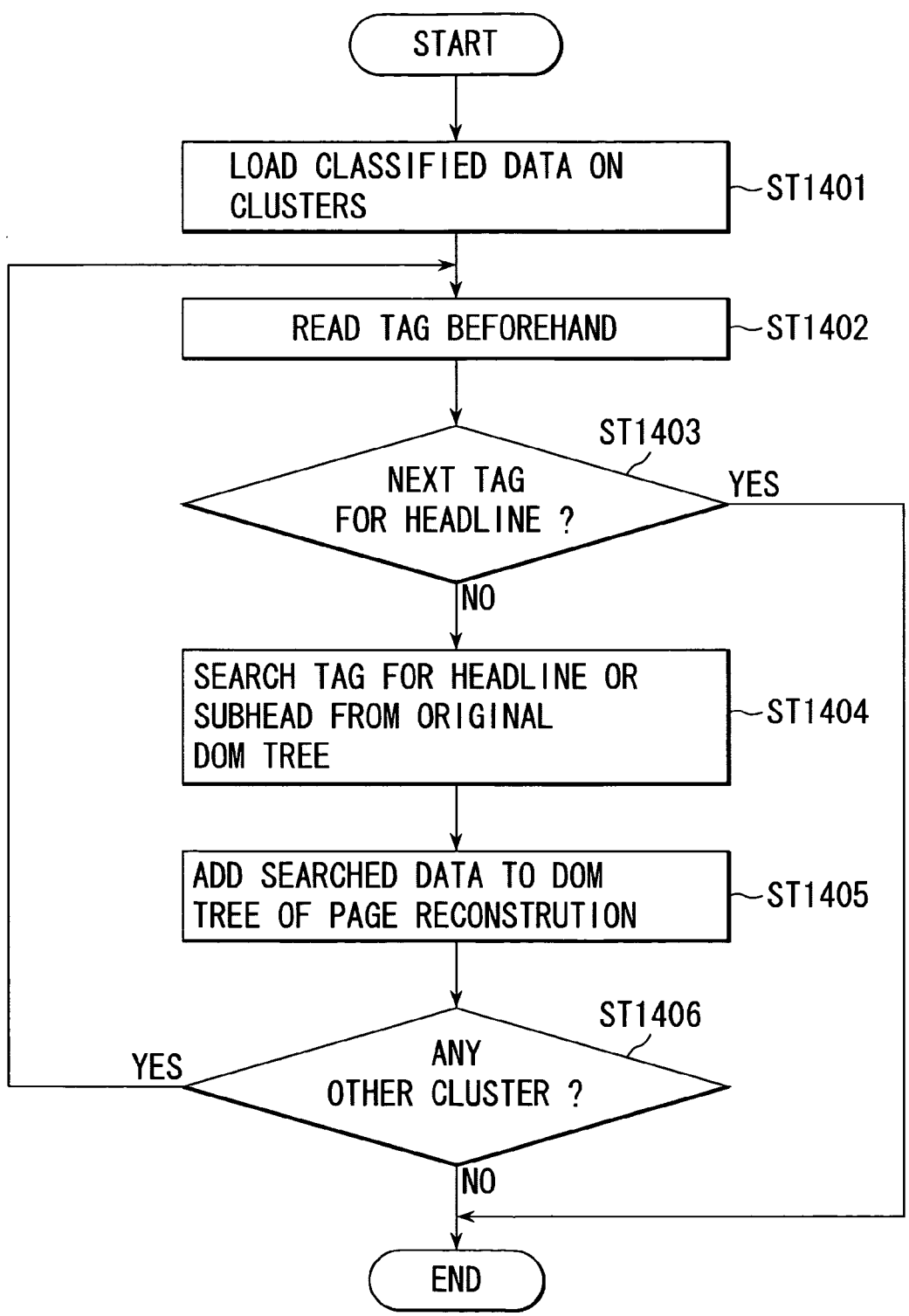
FIG. 14 is a flowchart showing a procedure for reconstructing a Web page (at the time a top page 133 created).

FIG. 14 is a flowchart showing a procedure for reconstructing a Web page (at the time the top page 133 is created).

First, the adaptation engine 32 loads classification data on clusters (ST1401). Successively, the adaptation engine 32 reads tags in a descending order from the original DOM tree (35 of FIG. 2) (ST1402), searches the tag of a headline or a subhead from the original DOM tree based on the classification data on the clusters (ST1404), and adds the tag of interest to the DOM tree of the page for reconstruction (ST1405). If there is a next tag of interest in the original DOM tree (YES at ST1406), then the adaptation engine 32 reads that tag by returning to ST502, and if the next tag of interest is not the tag of a headline (it is the tag of a subhead) (N0 to ST1403), then the adaptation engine 32 searches the tag of a subhead from the original DOM tree (ST1404), and adds the tag of interest to the DOM tree of the page for reconstruction (ST1405). In this way, the adaptation engine 32 searches the tags of the headline and of the subheads for reconstructing the top page 133, and adds them to the DOM tree of the page for reconstruction to complete the page for reconstruction.

Similarly, the links-to-articles list page 135 and the body-of-story/article page 136 can be created by searching, in ST1404, links to articles and a body of story/article from the original DOM tree on the basis of the classification data on the clusters, and adding, in ST1405, the tags of interest to the original DOM tree of the pages for reconstruction. And by setting links necessary for each of the reconstructed pages created in the above way, moves from one page to another such as shown in FIG. 13 can be realized.

Thus, according to the present embodiment, Web pages designed for the display environment of personal computers can be displayed by conversion into a design tailored to the display environment of mobile terminals such as PDAs. Specifically, by reconstructing a Web page into a size (resolution) displayable at a time on the display screen of a mobile terminal, it becomes possible to browse the whole Web page without scrolling. Further, the main page is constituted by a headline and subheads, and if the headline is designated on this top page, the body-of-story page of the aforementioned headline of interest can be displayed, and if a subhead is designated, a list page providing links to articles belonging to the aforementioned subhead of interest can be displayed, for example. Thus, each of the Web pages is provided in a manner having certain regularity as a whole, whereby Web browsing efficient for a user becomes possible. Further speaking, trial and error in operation for reaching a target Web page can be eliminated, whereby Web browsing straight to the content itself becomes possible.

Further, according to the present embodiment, Web pages can be reconstructed if they are written in page description languages being interpretable and renderable. That is, although there are various types of Web page description languages, such as HTML (HyperText Markup Language), XHTML (extensible HyperText Markup Language), XML+ CSS (cading Style Sheets), the present embodiment can realize reconstruction of Web pages created in these various description languages under the same logic. By contrast, a method of reconstructing a Web page involving a semantics-based analysis of tags would require an analyzing program corresponding to each type of page description language, and also entail tremendous analysis time. Compared with such a method of reconstructing a Web page involving a semantics-based analysis of tags, the present embodiment can remarkably reduce costs entailed for page reconstruction.

Further, the present embodiment creates reconstructed pages using the tags of an original Web page, whereby an advantage is provided that the reconstructed Web pages can be browsed directly using the existing Web browser. Further, Web pages can be reconstructed without dependence on the type of language (Japanese, English, or the like) and locale.

Note that the page reconstructing program may not only be used by incorporation into the Web-enabled electronics apparatus 100, but also be provided as a program incorporatable into a personal computer and a computer for use as a server, through a storage medium and a communication medium.

Figure 15:
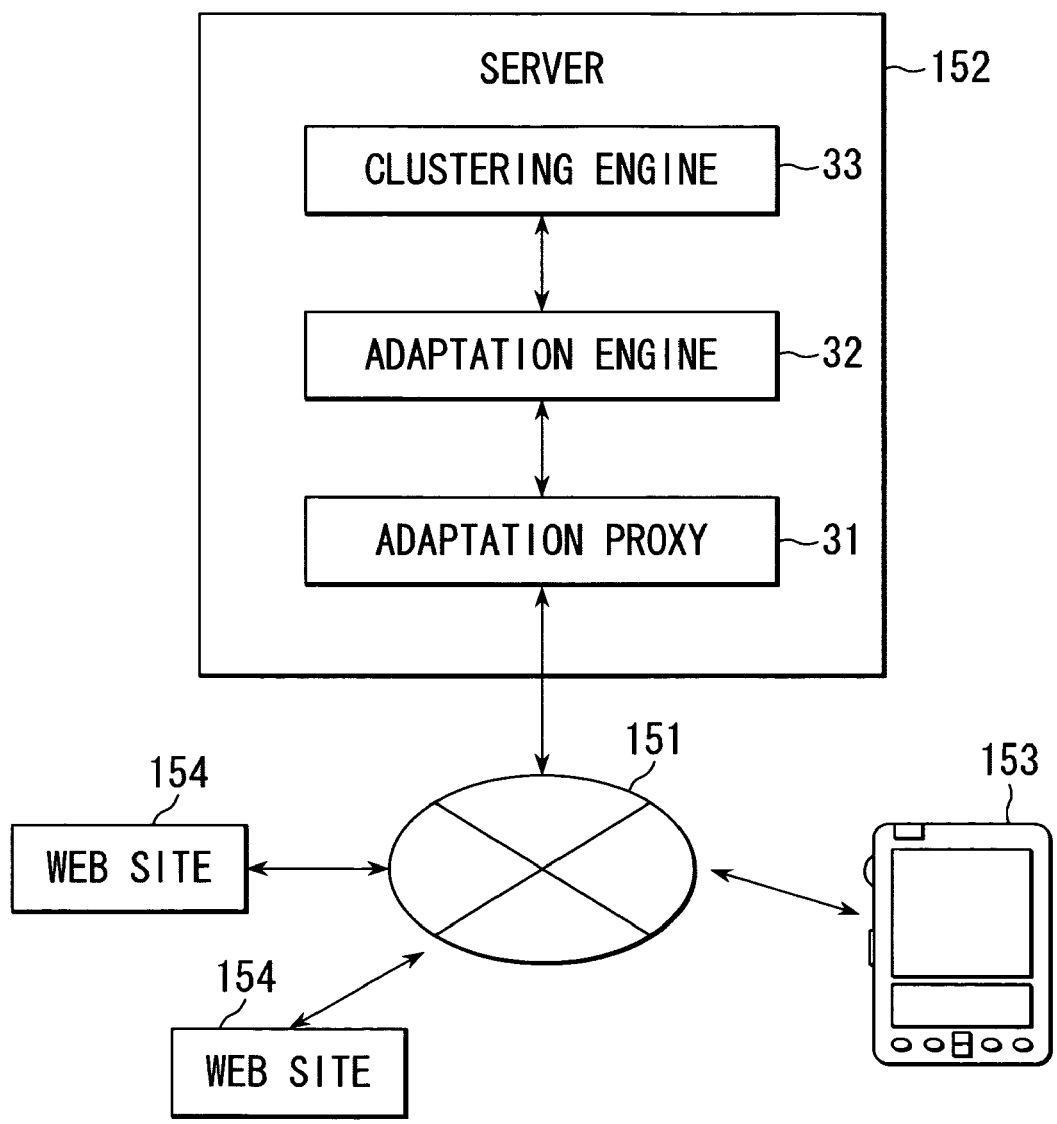
FIG. 15 is a block diagram showing a configuration in a case of reconstructing a Web page on a server on a network.
Figure 16:
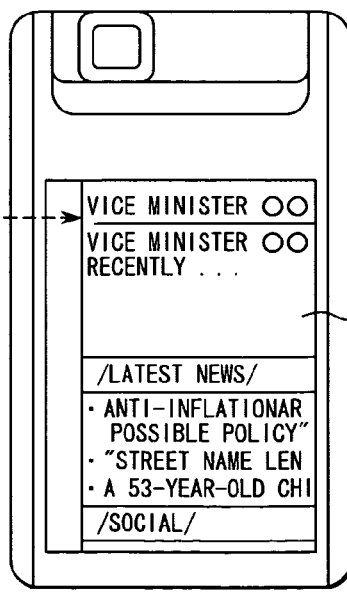
FIG. 16 is a view showing a state in which a usual Web page is displayed on a display device of a low-resolution.

As shown in, e.g., FIG. 15, it may be configured such that the adaptation proxy 31, the adaptation engine 32, the clustering engine 33 which are modules constituting the page reconstructing program are incorporated beforehand into a server 152 existing on a network 151 such as a LAN (Local Area Network) or the Internet, and such that the server 152 acquires, in response to a request from a client 153 which is a Web-enabled electronics apparatus such as a PDA, a Web page designated by the client 153 from a Web site 154, and performs a series of processing for reconstructing the Web page, for distribution of the reconstructed page to the client 153 via the network 151.

Further, it may alternatively be configured such that the components, namely, the adaptation proxy, the adaptation engine, the clustering engine are distributed to a plurality of servers, to allow the plurality of servers to perform the series of processing involved for the reconstruction of a Web page in cooperation with one another in a distributed manner.

Note that the present invention is not limited to any of the above-mentioned embodiments, but may be embodied by appropriate modification within the scope of the technical idea of the present invention.

INDUSTRIAL APPLICABILITY

As described above, according to the present invention, it has become possible to efficiently browse the content of the whole part of a high-resolution Web page designed for personal computers without scrolling or with a small amount of scrolling in low-resolution display environments, and also, to reconstruct a Web page described in various types of languages at a low cost.

The invention claimed is:

1. A web page processing method comprising:
  acquiring a first web page including display elements;
  identifying a headline and a story body in the first web page by
    creating an internal depiction of the first web page;
    computing positions of the display elements based the internal depiction;
    classifying closely related display elements together as clusters based on the computed positions of the display elements;
    discriminating a cluster of headlines and story bodies from other clusters by determining a center-of-gravity line which is a vertical line that crosses the largest number of display elements in the internal depiction and judging clusters as one of left, right, or middle in reference to the center-of-gravity line, wherein the cluster of headlines and story bodies is middle with respect to the other clusters;
    forming groups, a group including clusters having the same character attributes;
    calculating an average number of characters per cluster for each of the groups; and
    determining the headline and the story body, wherein a group having a low average is the headline and a group having a high average is the story body;
  creating a second web page including the story body from the first web page; and
  creating a third web page including the headline from the first web page, wherein the headline in the third web page is a link to the second web page containing the story body.

2. The web page processing method of claim 1, wherein the story body contains a list of links to articles belonging to the headline.

3. The web page processing method of claim 1 further comprising displaying the second web page and the third web page.

4. A web-compatible electronic device comprising:
  means for acquiring a first web page including display elements;
  means for identifying a headline and a story body in the first web page comprising:
    means for creating an internal depiction of the first web page;
    means for computing positions of the display elements based the internal depiction;
    means for classifying closely related display elements together as clusters based on the computed positions of the display elements;
    means for discriminating a cluster of headlines and story bodies from other clusters by determining a center-of-gravity line which is a vertical line that crosses the largest number of display elements in the internal depiction and judging clusters as one of left, right, or middle in reference to the center-of-gravity line, wherein the cluster of headlines and story bodies is middle with respect to the other clusters;
    means for forming groups, a group including clusters having the same character attributes;
    means for calculating an average number of characters per cluster for each of the groups; and means for determining the headline and the story body, wherein a group having a low average is the headline and a group having a high average is the Story body;

means for creating a second web page including the story body from the first web page; and means for creating a third web page including the headline from the first web page, wherein the headline in the third web page is a link to the second web page containing the story body.

5. The web-compatible electronic device of claim 4, wherein the story body contains a list of links to articles belonging to the headline.

6. The web-compatible electronic device of claim 4 further comprising means for displaying the second web page and the third web page.

7. A computer readable medium having a computer program for executing a web page processing method, the method comprising:

acquiring a first web page including display elements;

identifying a headline and a story body in the first web page by creating an internal depiction of the first web page;

computing positions of the display elements based the internal depiction;

classifying closely related display elements together as clusters based on the computed positions of the display elements;

discriminating a cluster of headlines and story bodies from other clusters by determining a center-of-gravity line which is a vertical line that crosses the largest number of display elements in the internal depiction and judging clusters as one of left, right, or middle in reference to the center-of-gravity line, wherein the cluster of headlines and story bodies is middle with respect to the other clusters;

forming groups, a group including clusters having the same character attributes;

calculating an average number of characters per cluster for each of the groups; and determining the headline and the story body, wherein a group having a low average is the headline and a group having high average is the story body;

creating a second web page including the story body from the first web page; and creating a third web page including the headline from the first web page, wherein the headline in the third web page is a link to the second web page containing the story body.

8. The computer readable medium of claim 7, wherein the story body contains a list of links to articles belonging to the headline.

9. The computer readable medium of claim 7, wherein the method further comprises displaying the second web page and the third web page.

\* \* \* \* \*

UNITED STATES PATENT AND TRADEMARK OFFICE
CERTIFICATE OF CORRECTION

| | |
|---|---|
| PATENT NO. | : 7,272,787 B2 |
| APPLICATION NO. | : 10/523234 |
| DATED | : September 18, 2007 |
| INVENTOR(S) | : Masayuki Nakamura et al. |

Page 1 of 1

It is certified that error appears in the above-identified patent and that said Letters Patent is hereby corrected as shown below:

Claim 4, col. 13, line 3, "Story" should read --story--.

Signed and Sealed this

Eleventh Day of December, 2007

JON W. DUDAS
*Director of the United States Patent and Trademark Office*